No. 621,301.  
W. C. D. EVANS.  
NUT AND WASHER FOR VEHICLE AXLES.  
(Application filed Aug. 9, 1898.)  
Patented Mar. 14, 1899.
(No Model.)
Fig. 1.
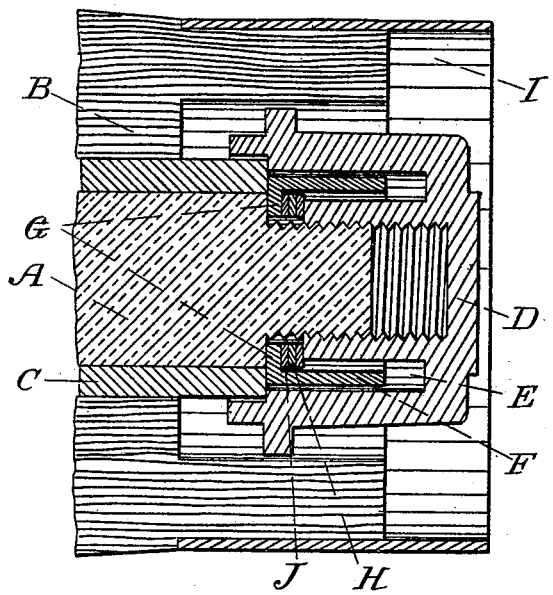
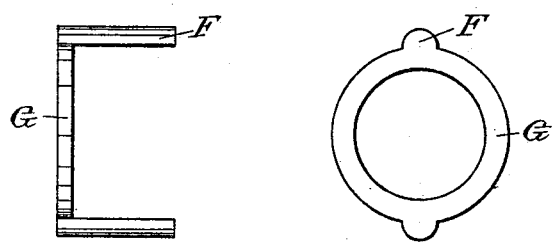
Fig. 2.
WITNESSES.  
J. C. deeGranges.  
M. McGinnis.
INVENTOR.  
Wm C. D. Evans,  
by Hazard & Harpham  
his Attorneys.
THE NORRIS PETERS CO., PHOTO-LITHO., WASHINGTON, D. C.

United States Patent Office.

WILLIAM C. D. EVANS, OF NORWALK, CALIFORNIA.

NUT AND WASHER FOR VEHICLE-AXLES.

SPECIFICATION forming part of Letters Patent No. 621,301, dated March 14, 1899.

Application filed August 9, 1898. Serial No. 688,213. (No model.)

*To all whom it may concern:*

Be it known that I, WILLIAM C. D. EVANS, a citizen of the United States, residing at Norwalk, in the county of Los Angeles, State of California, have invented new and useful Improvements in Nuts and Washers for Vehicle-Axles, of which the following is a specification.

The object of my invention is to provide means whereby the objectionable effects of the wearing off of the end of the axle-box and the nut of a vehicle may be overcome, and the mechanism whereby I accomplish the same is herein described, and shown in the accompanying drawings, in which—

Figure 1 is a central sectional view of a part of a hub, axle-box, axle, nut, and washers embodying my invention. Fig. 2 is a detail of one of my washers.

A is the axle.

B is the wooden part of the hub.

C is the axle-box.

D is the nut on the end of the axle to hold the wheel thereon. In the nut D is an annular recess J, which when the vehicle is new is filled with the washers G and H. The washers H are very thin and fit over the end of the axle and lie within the annular recess J of the nut. The washer G also fits over the end of the axle and lies within the annular recess J of the nut. It is provided with one or more projecting lugs F, which extend into holes E in the nut D. I have shown two lugs, as I consider that number desirable and sufficient for all practical purposes. These lugs project over the washers H and hold them in the recess in the nut when it is removed for oiling, and thereby prevents the washers from falling on the ground.

I is the iron hub-band, which extends over and protects the nut.

As the end of the axle-box C and the nut D become worn there will be developed a space between them which will cause the wheel to rattle, which is very objectionable. I prevent this rattling by removing from time to time one of the thin washers H, thereby permitting the nut D to move farther upon the axle until it rests as near to the end of the box as required, thereby eliminating all unnecessary space intervening between the nut and the box.

Having thus described my invention, what I claim as new, and desire to secure by Letters Patent, is—

1. The combination of a threaded axle-nut, having longitudinal openings for the reception of the lugs of a washer and an annular recess for the reception of washers; the diameter of the recess being greater than the diameter of the end of the axle, with a washer, having projecting lugs adapted to pass into the openings in the nut, and a plurality of thin washers, adapted to enter into the recess in the nut and between it and the washer-containing lugs, and to be held in place therein by the washer-containing lugs, substantially as shown and described.

2. A threaded axle-nut, having longitudinal openings for the reception and retention of the projecting lugs of a washer, and an annular recess adapted to receive a number of washers, in combination with a number of washers; one of the washers having projecting lugs adapted to enter the openings in the nut, and hold the washers in place in the recess in the nut, the whole adapted to be used on a threaded spindle.

3. The combination with the axle A, hub B, axle-box C, of the threaded axle-nut D, having longitudinal openings E and annular recess J, the washer G having projecting lugs F and the thin washers H, substantially as shown and for the purposes described.

In witness that I claim the foregoing I have hereunto subscribed my name this 21st day of July, 1898, at Los Angeles, California.

WILLIAM C. D. EVANS.

Witnesses:
ALBERT L. ROWE,
BURTON TRUITT.